Patented Oct. 8, 1940

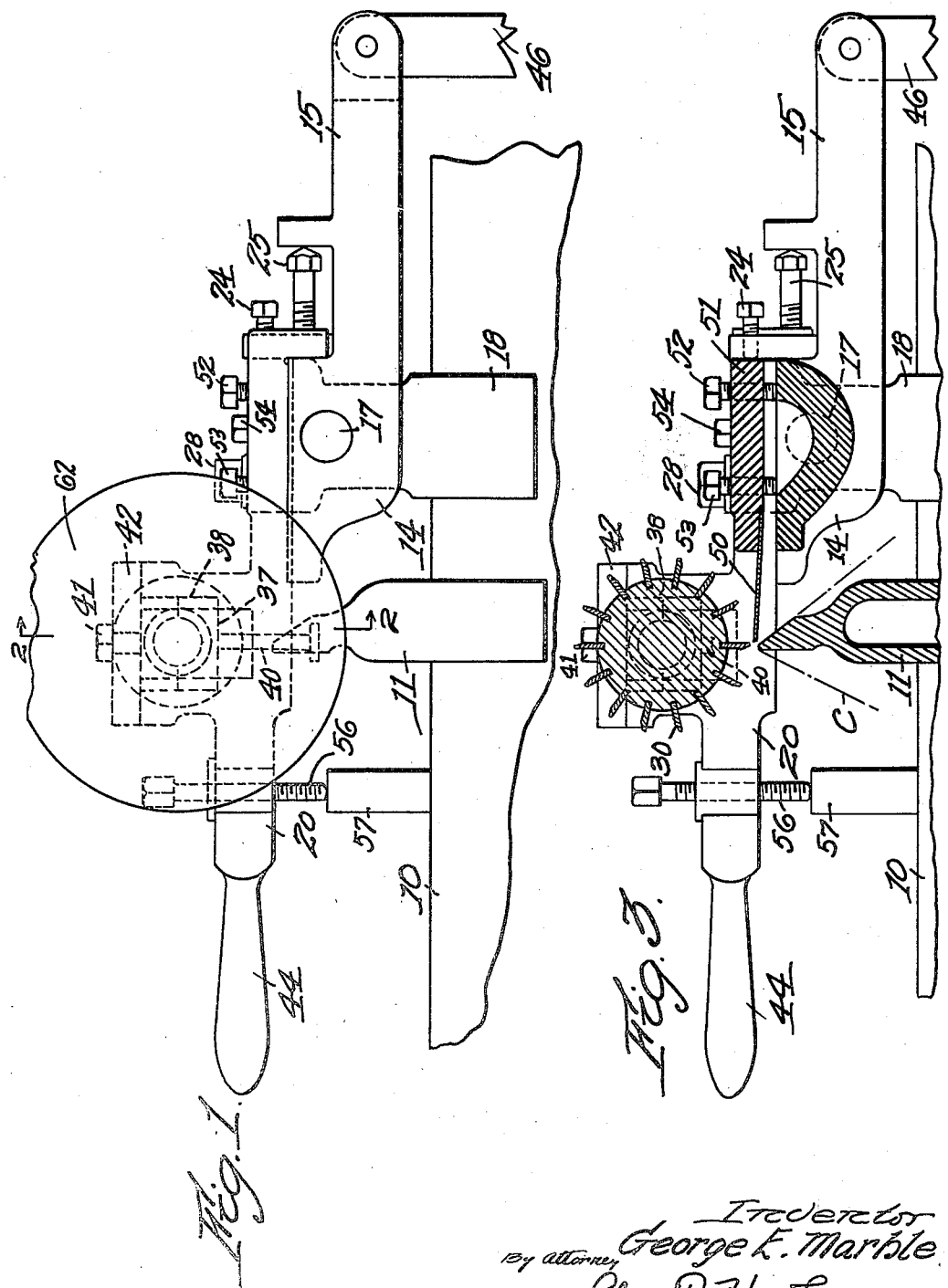

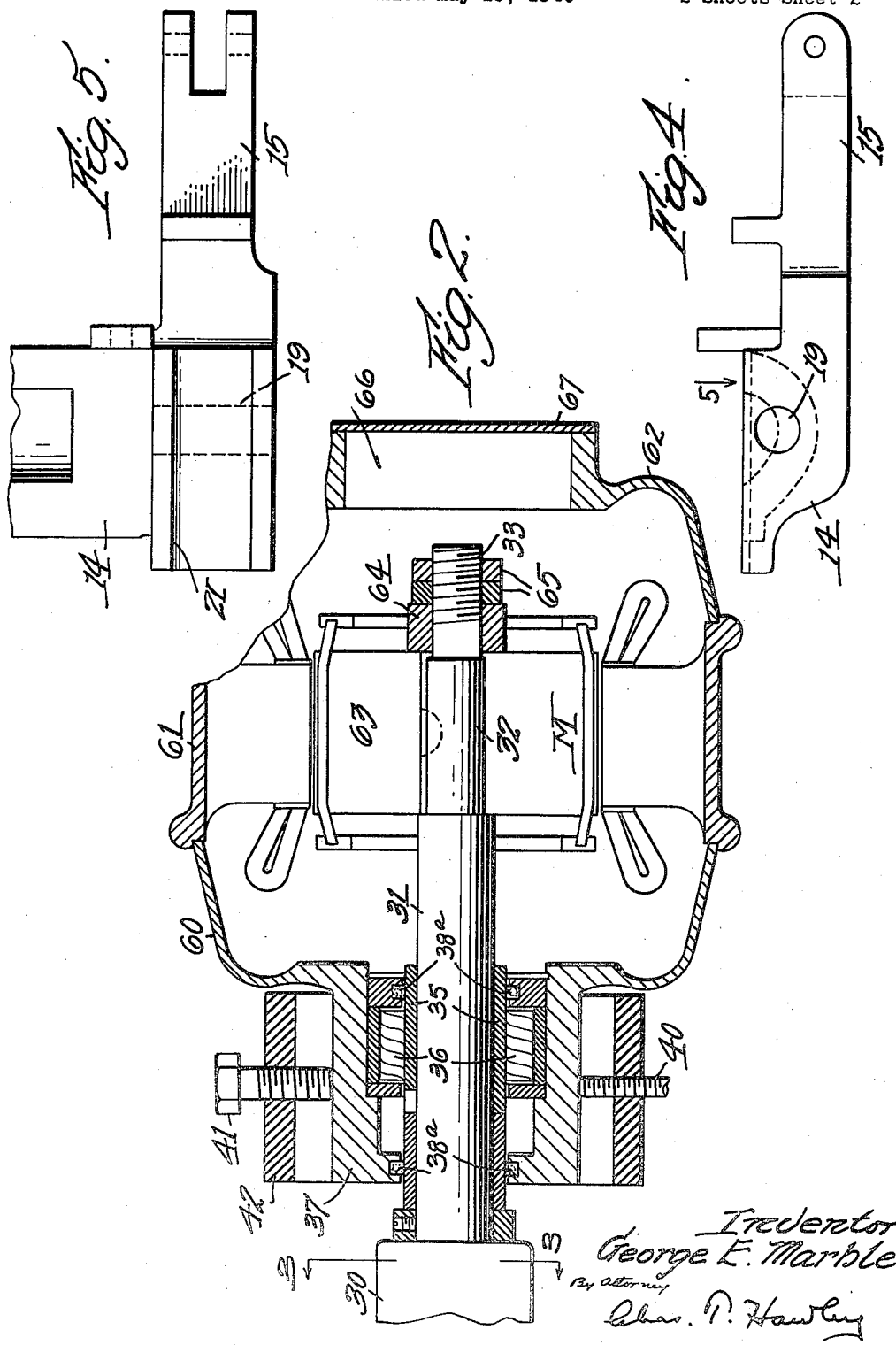

2,217,344

UNITED STATES PATENT OFFICE 2,217,344

CUTTER DRIVE FOR CLOTH SHEARS

George E. Marble, Worcester, Mass., assignor to Curtis & Marble Machine Company, Worcester, Mass., a corporation of Massachusetts Application May 13, 1940, Serial No. 334,784

5 Claims. (Cl. 26—15)

This invention relates to machines used in shearing the face of a fabric during the finishing thereof and in which the cloth is drawn between a fixed cloth rest and a shearing device comprising a fixed blade and a rapidly rotating cutter.

In the operation of such machines it is customary to join successive lengths of cloth together by transverse seams, and it is necessary to make provision for passing these seams under the shearing device. A common expedient is to mount the cutting elements on a movable support which may be actuated to separate said cutting elements from the cloth rest at the time a seam is passing over the rest. It has also been proposed to arrange a driving motor for the rotating cutter on an offset and heavily overhanging bracket attached to one end of the movable cutter support.

It is the general object of my invention to provide an improved construction in a cloth shear by which a driving motor is supported directly on one of the bearings of a rotating cutter, and in which the rotor of the motor is mounted directly on an end portion of the cutter shaft. By thus positioning the driving motor, a widely offset and heavily unbalanced load on the pivoted movable support is avoided, and the reduced weight of the parts makes it much easier to shift the cutting elements to pass a seam and also easier to accurately return the parts to shearing position.

My invention further relates to arrangements and combinations of parts which will be hereinafter described and more particularly pointed out in the appended claims.

A preferred form of the invention is shown in the drawings, in which—

Fig. 1 is a side elevation of parts of a cloth shear embodying my improvements;

Fig. 2 is a partial sectional view, taken along the line 2—2 in Fig. 1;

Fig. 3 is a sectional side elevation, taken along the line 3—3 in Fig. 2;

Fig. 4 is a side elevation of a pivoted supporting member; and

Fig. 5 is a partial plan view thereof, looking in the direction of the arrow 5 in Fig. 4.

Referring particularly to Figs. 1 and 3, I have shown a portion of the frame 10 of a cloth shear, which frame supports a fixed cloth rest 11 over which the cloth C is drawn during the shearing operation. A supporting member 14 (Figs. 4 and 5) is provided with an arm 15 at each side of the machine and is pivotally supported by studs 17 (Fig. 1) mounted in fixed brackets 18 and extending into pivot holes 19 in the ends of said support 14.

Bearing frame members 20 at both sides of the machine are mounted in guideways 21 (Fig. 5) on the support 14. The frame members 20 may be adjusted lengthwise by screws 24 and 25 (Fig. 1) and are each secured in adjusted position by a clamping screw 26.

The spiral rotating cutter 30 is provided with a cutter shaft 31 (Fig. 2) having an integral reduced extension 32 and a threaded outer end portion 33. The cutter shaft 31 also has a sleeve 35 mounted thereon to form the inner race of a roller bearing 36, which may be of commercial form and which is mounted in a bearing box 37. Suitable packing 38ª is provided at the ends of the box 37 to exclude dirt from the roller bearing.

The bearing box 37 is vertically slidable between the side walls 38 of a bearing box opening in the bearing frame member 20. A screw 40 in each bearing frame member provides vertical adjustment for the associated bearing box 37, and a binding screw 41 in a top plate 42 prevents upward displacement of the bearing box.

A handle 44 on the front end of each bearing frame member 20 constitutes one means for lifting the cutter 30 away from the cloth C and cloth rest 11. A link 46 (Fig. 1) is attached to the rear end of each arm 15 and may be connected to a foot pedal or to any desired automatic mechanism to form a second means for lifting the cutter.

A relatively stationary blade 50 is fixed to a holding plate 51 which extends across the width of the shear and which is provided with a plurality of screws 52 and 53 by which it may be angularly adjusted on the support 14. The plate 51 is then secured in adjusted position by clamping nuts 54. The blade 50 will be so adjusted that the cutting edge of the blade is in operative relation to the edges of the spiral blades in the revolving cutter 30.

The lowered position of the cutter 30 and blade 50, relative to the cloth rest 11, may be determined by stop screws 56 (Fig. 1) threaded in the bearing frame members 20 at each side of the machine and engaging fixed abutments 57.

The bearing box 37 at one side of the machine is provided with an integral casing portion or extension 60, the circular outer edge of which fits into a recess in the casing 61 of a motor M which is centered and supported thereby. An end housing 62 fits into a similar recess in the other face of the motor casing 61 and encloses and protects the outer end of the motor. The stator of the motor is concentric with and fixed to the casing 61.

The rotor 63 of the motor is keyed to the portion 32 of the cutter shaft 31 and may be secured thereon by a collar 64 and lock nuts 65, which are accessible through an enlarged opening 66 in the end housing 62 on removal of a covering plate 67. The parts 60, 61 and 62 may be welded or otherwise suitably secured together.

It will be evident that the driving motor M for the revolving cutter 30 is centered and entirely supported on the bearing box 37, with the exception of the rotor 63 which is supported on the cutter shaft 31. All parts of the driving motor are thus adjustable vertically with the cutter shaft and its bearing, and are always aligned and in driving relation to the cutter shaft in every vertical adjustment thereof.

It will be further noted that the heavily overhanging offset brackets previously used are not required with my improved construction, and that the weight of the parts on the pivoted support 14 is much reduced, with corresponding ease and convenience of manipulation.

Smoothness and quietness of operation is also attained, as there are neither gears nor flexible connections between the motor and the cutter.

With the construction shown, it is very simple and easy to remove the cutting device upward from operative relation to the cloth rest 11 as a seam approaches, and to return the cutting device to shearing position as soon as the seam has passed.

Having thus described my invention and the advantages thereof, I do not wish to be limited to the details herein disclosed, otherwise than as set forth in the claims, but what I claim is:

1. In a cloth shear having a fixed cloth rest, a rotating cutter and cutter shaft, a relatively stationary cutter blade and a movable support for said cutter and blade, that improvement which comprises bearing boxes for said cutter shaft, means to adjust said boxes on said movable support, an integral concentric casing extension on one of said bearing boxes, and a driving motor for said cutter having a stator and casing centered and secured only to said casing extension, and having a rotor fixed on said cutter shaft.

2. In a cloth shear having a fixed cloth rest, a rotating cutter and cutter shaft, a relatively stationary cutter blade and a movable support for said cutter and blade, that improvement which comprises bearing boxes for said cutter shaft, means to separately adjust said boxes on said movable support, an integral concentric casing extension on one of said bearing boxes, a driving motor for said cutter having a stator and casing centered by and secured only to said casing extension and having a rotor fixed on said cutter shaft, and an outer concentric casing member secured only to said motor casing and enclosing the outer end portions of said motor.

3. In a cloth shear having a fixed cloth rest, a rotating cutter and cutter shaft, a relatively stationary cutter blade and a movable support for said cutter and blade, that improvement which comprises a cutter-driving motor direct-connected to said cutter shaft, bearing boxes for said cutter shaft, means to adjust said boxes on said movable support, one of said bearing boxes having a concentric axial extension which constitutes the only means to support the stator and casing of said motor adjacent said bearing box and aligned with said cutter shaft, and said motor having a rotor mounted directly on and secured to an integral extension of said cutter shaft.

4. In a cloth shear having a fixed cloth rest, a rotating cutter and cutter shaft, a relatively stationary cutter blade and a movable support for said cutter and blade, that improvement which comprises bearing boxes for said cutter shaft, means to adjust said boxes on said movable support, a motor to drive said cutter and direct-connected thereto, and means to support the rotor of said motor entirely on said cutter shaft and all other parts of said motor entirely on one of said bearing boxes and concentric with said shaft.

5. In a cloth shear having a fixed cloth rest, a rotating cutter and cutter shaft, a relatively stationary cutter blade and a movable support for said cutter and blade, that improvement which comprises bearing boxes for said cutter shaft, means to adjust said boxes on said movable support, a concentric casing extension fixed on one of said bearing boxes, a motor to drive said cutter shaft and having a stator and casing centered by and secured to said casing extension and having a rotor fixed on said cutter shaft, and an outer end casing secured to and supported by said motor casing.

GEORGE E. MARBLE.